United States Patent [19]

Juso et al.

[11] Patent Number: 4,630,143

[45] Date of Patent: Dec. 16, 1986

[54] MAGNETIC RECORDING AND REPRODUCING DEVICE

[75] Inventors: Hiromi Juso, Gose; Kengo Sudoh; Yukihiko Haikawa, both of Higashihiroshima, all of Japan

[73] Assignee: Sharp Kabushiki Kaisha, Osaka, Japan

[21] Appl. No.: 748,486

[22] Filed: Jun. 25, 1985

[51] Int. Cl.⁴ ............................................. G11B 5/86
[52] U.S. Cl. ................................. 360/72.2; 360/74.4
[58] Field of Search ................ 360/13, 71, 72.1, 72.2, 360/72.3, 74.4

[56] References Cited

U.S. PATENT DOCUMENTS

| 3,699,527 | 10/1972 | Duerden | 360/72.2 |
| 4,120,006 | 10/1978 | Nagami et al. | 360/72.2 |
| 4,287,539 | 9/1981 | Bixby et al. | 360/18 |
| 4,357,638 | 11/1982 | Voshimaru et al. | 360/72.2 |

Primary Examiner—George G. Stellar
Attorney, Agent, or Firm—Flehr, Hohbach, Test, Albritton & Herbert

[57] ABSTRACT

A magnetic recording and reproducing device for recording information on the tape comprises an oscillation circuit for generating a reference clock, a position information generation circuit for generating position information, a recording head means, a reproducing head means, a means for controllably moving the magnetic tape and a central control circuit so that the device can record not only a primary information such as an audio signal but also a position information on the primary information. Such recording can be effected from any position on the tape such as immediately after an earlier recorded information (after-recording) by operating a simple input means such as a keyboard.

5 Claims, 7 Drawing Figures

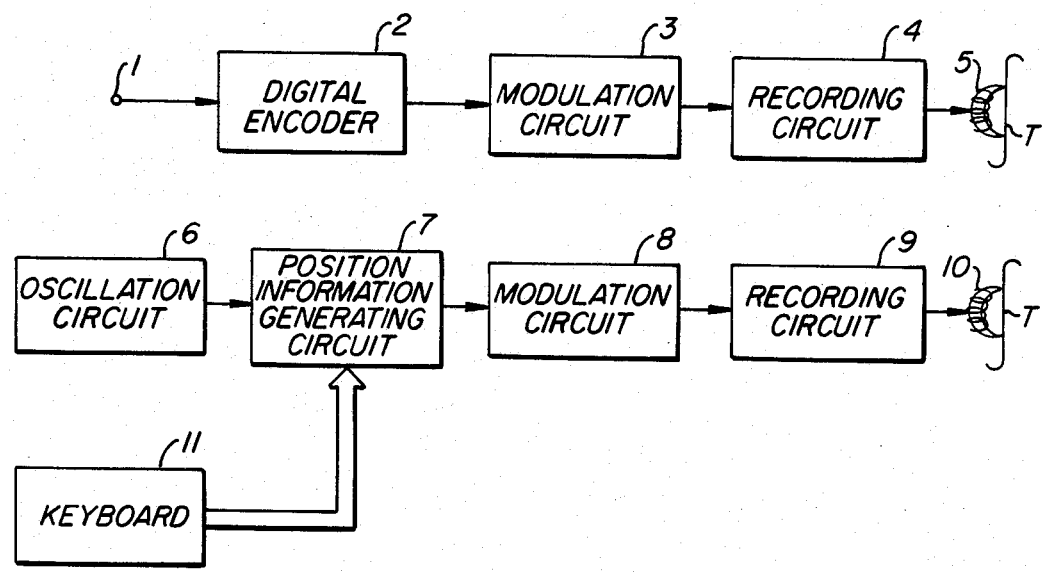
FIG._1. PRIOR ART
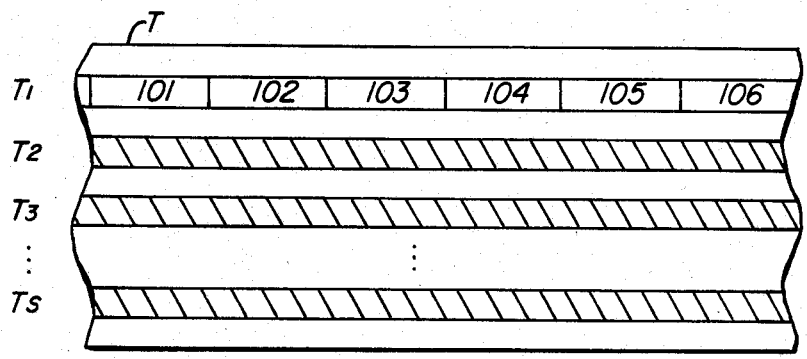
FIG._2.
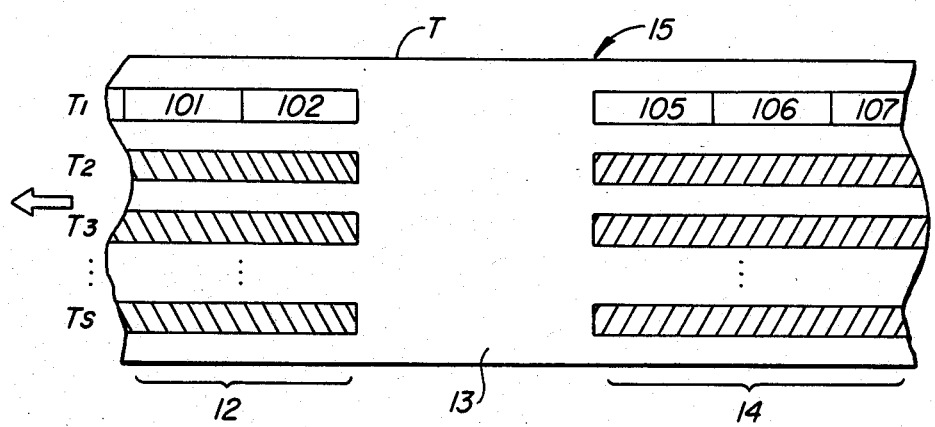
FIG._3.

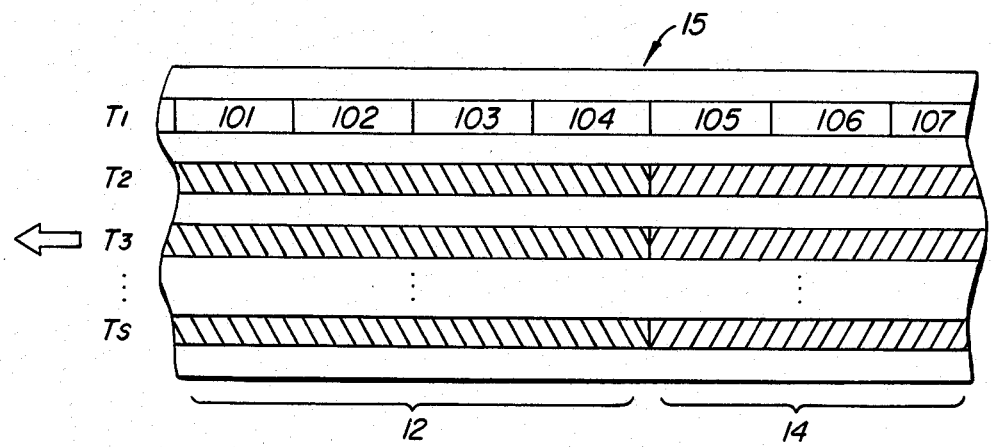
FIG._4.
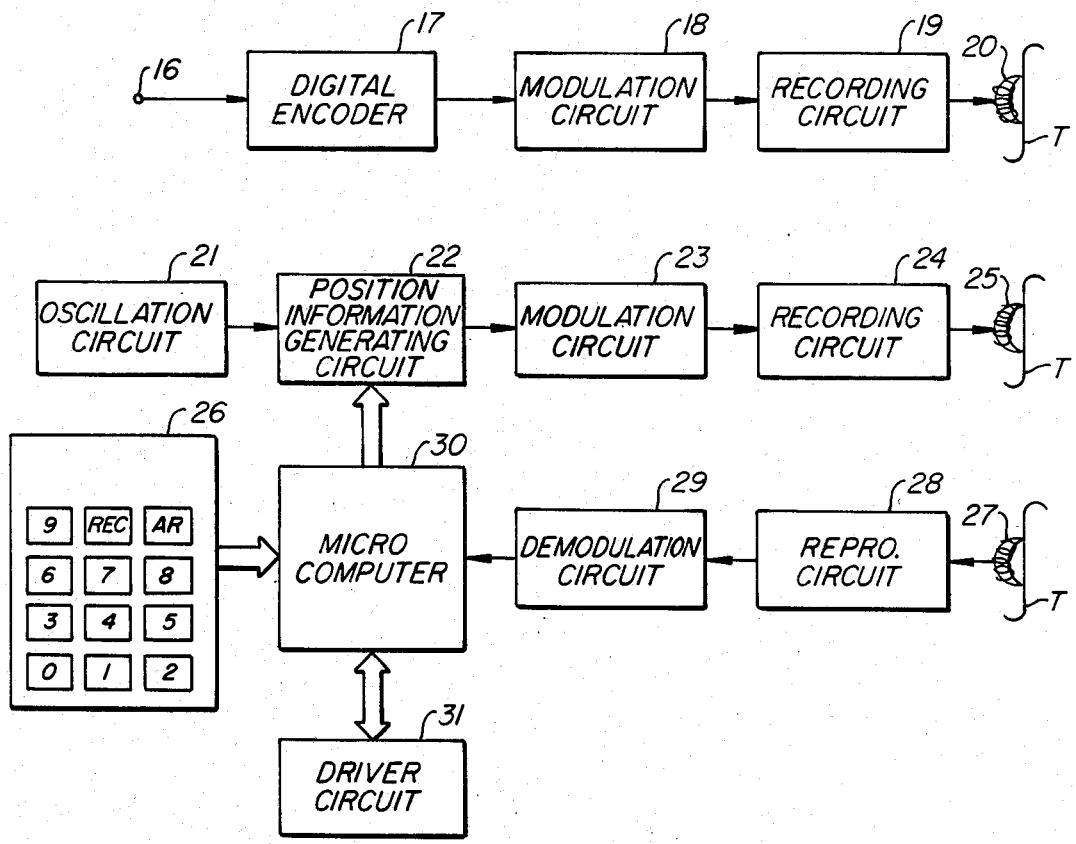
FIG._5.

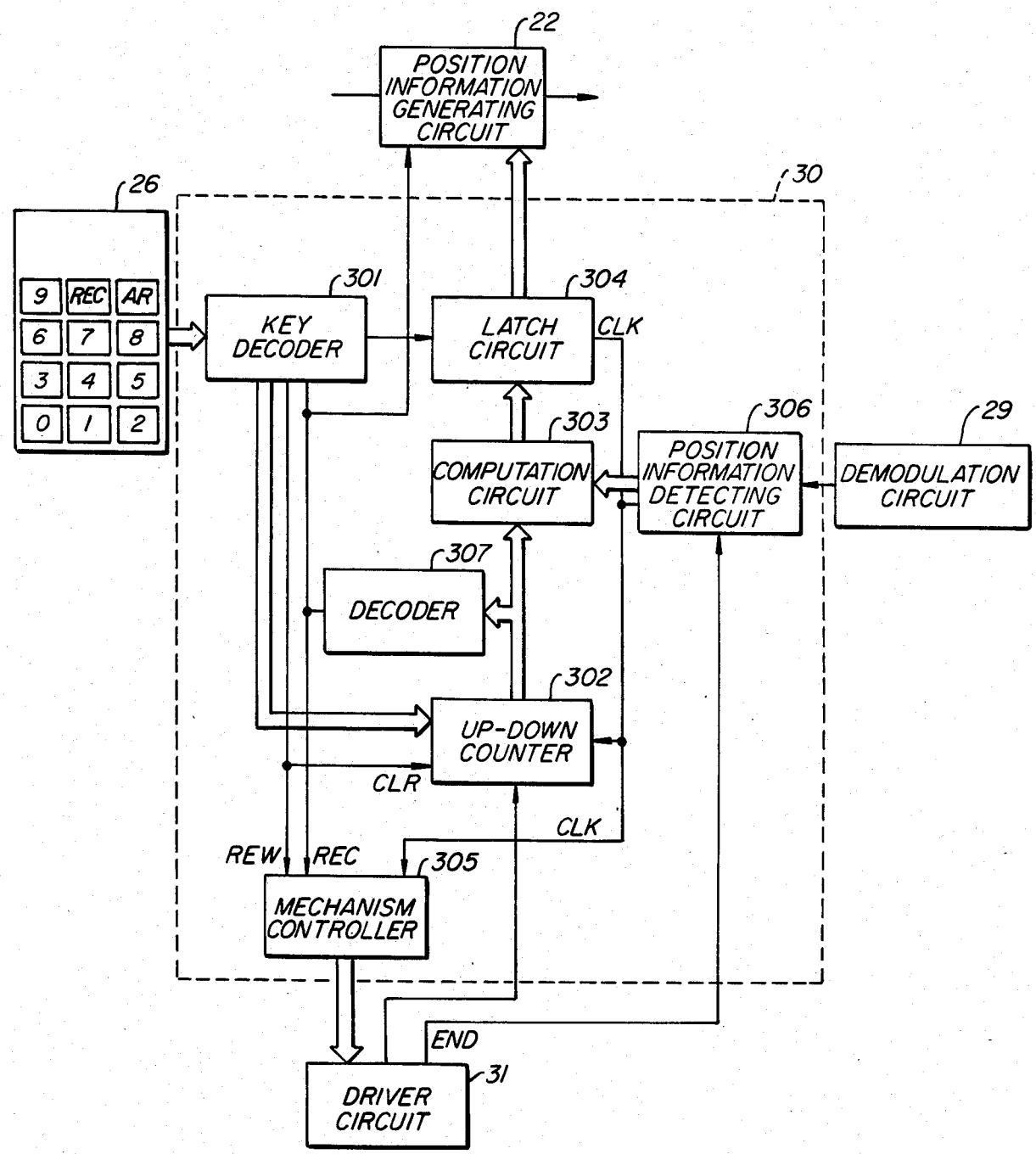
FIG._6.

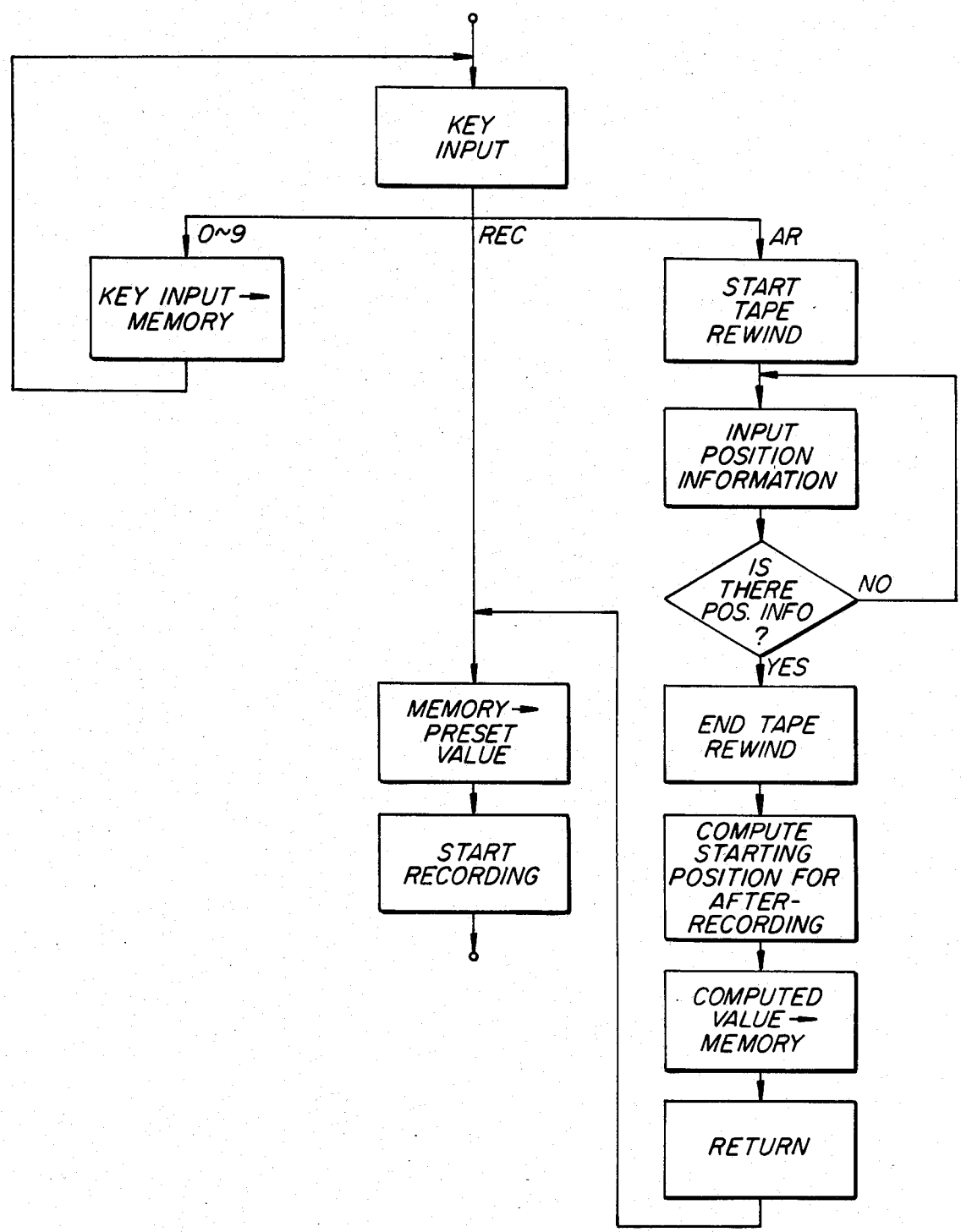
FIG._7.

MAGNETIC RECORDING AND REPRODUCING DEVICE

This invention relates to a magnetic recording and reproducing device which makes it possible to record an additional primary information on a magnetic tape on which another primary information such as audio signals is already recorded as well as position information.

FIG. 1 shows a known circuit structure of a device for recording a primary information such as an audio signal and a position information for showing the position of the primary information. An analog audio signal (primary information) enters such a system through an input terminal 1 and is digitally encoded in a digital encoder circuit 2 where it is sampled in units of predetermined time periods and quantized. An interleave, an error correction symbol, etc. are attached and thereafter it is modulated in a modulation circuit 3 into a waveform suited for recording and reproducing, transferred through a recording circuit 4 to a magnetic head for primary information and recorded on a magnetic tape T. Tracks $T_2$ through $T_S$ in FIG. 2 show the format of recorded primary information.

At the same time, a position information for showing the position of the primary information is generated at a predetermined fixed time interval by using a position information generation circuit to count reference clock signals generated from an oscillation circuit 6. It is then passed through a modulation circuit 8 and a recording circuit 9 and is recorded on the magnetic tape T by a recording head 10 for position information. Track $T_1$ of FIG. 2 shows its recorded format.

When a position information is recorded, its initial position must be determined manually. When a conventional device is used, therefore, a preset key on a keyboard 11, for example, must be operated as soon as recording of the primary information is started so as to set a counter in the position information generation circuit 7 at an initial position. In the case of a so-called "after-recording" where a primary information is recorded additionally after a different primary information which is already recorded, the following problems must be taken into consideration.

Firstly, when a new information 14 is recorded as shown in FIG. 3 by leaving a fixed amount of space (a blank time) 13 after an earlier recorded information (inclusive of both primary information on tracks $T_2$ through $T_S$ and position information on track $T_1$), the user must reproduce the earlier recorded information 12 to read the last value of the position information in this earlier recorded information 12 (or "102" in this example) and then move the magnetic tape T to a starting position 15 for the after-recording of the new information 14 (or "105" in this example). In other words, the user must guess the starting position 15 from the last position information "102" and preset the position information "105" by a preset key before beginning to record the new information 14.

Secondly, when a new information 14 is added after an earlier recorded information 12 (inclusive of both primary information on tracks $T_2$ through $T_S$ and position information on track $T_1$) without leaving any space therebetween as shown in FIG. 4, the user must stop the magnetic tape T after advancing it to the starting position 15 while reproducing the earlier recorded information, read the position information there ("104" in this example), add 1 to this value (to obtain "105" in this example) and preset this value by a preset key before recording the new information 14.

In either situation, the required procedure is complicated and can easily cause operational errors. In certain cases, it may not be possible to record a correct position information. It is therefore an object of the present invention in view of the above to provide a recording and reproducing device which makes "after-recording" possible with an extremely simple operation.

Another object of the present invention is to provide a recording and reproducing device which can record a correct position information together with a primary information such as an audio signal even from a middle position on a medium such as a magnetic tape.

It is a further object of the present invention to provide a recording and reproducing device which makes "after-recording" possible from a desired position on a recording medium such as a magnetic tape simply by operating on an input means such as a keyboard.

The above and other objects of the present invention will become apparent to those skilled in the art from the detailed description given below. They are achieved by providing a device adapted to record new primary and position information either after an earlier recorded information or at a desired position in the middle of an unrecorded tape. Such a device according to the present invention includes a means for generating a reference clock, a position information generation circuit for generating position information, a recording head means, a reproducing head means, a means for controllably moving a magnetic tape and a central control circuit so that after recording on a tape can be achieved by an operation on a simple keyboard-type input means.

FIG. 1 is a block circuit diagram of a conventional magnetic recording and reproducing device.

FIGS. 2 through 4 show formats in which primary information and position information are recorded on a magnetic tape.

FIG. 5 is a block circuit diagram of a magnetic recording and reproducing device according to one embodiment of the present invention.

FIG. 6 is a block circuit diagram of the microcomputer of FIG. 5.

FIG. 7 is a flow chart for explaining the present invention.

In FIG. 5 which shows a circuit diagram of a recording and reproducing device embodying the present invention, numeral 16 is an input terminal for receiving analog primary information such as an audio signal, numeral 17 is a digital encoder circuit adapted to sample and quantize the analog primary information inputted from the input terminal 16 and to output it as a digital signal with data such as an interleave and an error correction symbol, numeral 18 is a modulation circuit adapted to modulate the digitized primary information from the encoder circuit 17 into a waveform which is easy for recording and reproducing, numeral 19 is a recording circuit for supplying the primary information from the modulation circuit 18 to a primary information recording head 20 to record it on a magnetic tape T. The above-mentioned components essentially make up a primary information recording system.

Numeral 21 is an oscillation circuit for generating a reference clock. Numeral 22 is a position information generation circuit. It is presettable and contains a counter adapted to output a position information at a fixed time interval by counting the aforementioned reference clock. Numeral 23 is a modulation circuit adapted to modulate the position information from the position information generation circuit 22 into a waveform necessary for recording and reproducing. Numeral 24 is a recording circuit adapted to supply the position information to a position information recording head 25 to have it recorded on the magnetic tape T. Numeral 26 indicates a keyboard which contains number keys "0" through "9", a recording key REC and an after-recording key AR; numeral 27 is a position information reproducing head for reproducing position information from the magnetic tape T; numeral 28 is a reproducing circuit for reproducing the aforementioned position information by driving the position information reproducing head; numeral 29 is a demodulation circuit for demodulating reproduced position information; and numeral 30 is a microcomputer as a central circuit for controlling the position information generation circuit 22 and a mechanism driving circuit 31 according to the information from the keyboard 26 and the demodulation circuit 29. An example of this microcomputer is explained in detail by way of a flow chart shown in FIG. 6.

To start, let us consider normal recording of position information. In this case, an initial value for position information is inputted from the keyboard 26 by operating the number keys "0" through "9". This input is read by the microcomputer 30 through a key decoder 301 and a presettable up-down counter 302 is preset to that initial value. Concurrently therewith, this initial value is transferred to a computation circuit 303 and further latched to a latch circuit 304 by a latch signal from the key decoder 301 after number keys are operated. If the recording key REC on the keyboard 26 is pressed, the microcomputer 30 outputs a preset signal from the key decoder 301, transfers it to the position information generation circuit 22 and presets to the counter in this circuit the initial value latched to the aforementioned latch circuit 304. At the same time, it is given from the key decoder 301 to the aforementioned up-down counter 302 and the aforementioned initial value preset to the counter 302 is set to "0".

Recording is started thereafter and the position information generation circuit 22 adds the reference clock from the oscillation circuit 21 to its initial value. This value is passed through the modulation circuit 23 and the recording circuit 24 and is recorded on the magnetic tape T from the position information recording head 25. (See track $T_1$ of FIG. 2.) As for the audio signal inputted from the input terminal 16 (the primary information), it is first digitized by the digital encoder circuit 17, then passed through the modulation circuit 18 and recording circuit 19, and recorded on the magnetic tape T from the primary information recording head 20. (See tracks $T_2$ through $T_S$ of FIG. 2.)

In the case of after-recording, let us consider the situation where the heads 20, 25 and 27 are at the starting position 15 of FIGS. 3 and 4 for after-recording. In the case of FIG. 3, therefore, after-recording starts from the position two units of space after the last position of the earlier recorded information 12 (with position information "102") while, in the case of FIG. 4, there is no space left after the last position of the earlier recorded information 12 (with position information "104"). When the user presses the after-recording key AR on the keyboard 26 in this situation, the microcomputer 30 responds by causing the key decoder 301 to provide a rewind signal REW to the mechanism control circuit 305 and a clear signal CLR to the up-down counter 302. The mechanism control circuit 305 responds to this command by causing the mechanism driving circuit 31 to set the mechanism in a rewind condition and starts rewinding the magnetic tape T. When the rewind condition is entered into, the aforementioned mechanism driving circuit 31 feeds back to the microcomputer the data (pulses) which relate to the distance traveled by the magnetic tape T. The up-down counter 302 is made to count the data. The modulation circuit 29 provides the position information reproduced from the position information producing head 27 to the position information detection circuit 306 of the microcomputer 30 to check errors such as CRC check of the position information.

In the example of FIG. 4, "104" is obtained as the last position information input as soon as the rewinding is started. In the example of FIG. 3, position information "102" is obtained after the space 13 is passed and the position "102" is reached. Thus, the microcomputer 30 detects the presence of position information where such position information is detected by the detection circuit 305 and provides the detected position information "102" or "104" to the computation circuit 202. This position information is combined with the distance traveled by the rewinding magnetic tape T as counted by the aforementioned up-down counter 302 and the computation circuit 303 computes the position where after-recording is started. In both situations in the example above, this position is "105".

Next, the aforementioned position information detection circuit 306 outputs a detection signal, providing it to the latch circuit 304 as a latch signal so as to latch the position information "105" for the starting position of the after-recording in the computation circuit 303. At the same time, the up-down counter 302 is set in a down-count mode and a fast-forward signal FWD is given to the mechanism control circuit 305 to switch the mechanism in a fast-forward mode by the mechanism driving circuit 31. In this fast-forward mode, the up-down counter 302 counts down the distance information which was counted up at the time of rewinding by the pulses from the mechanism driving circuit 31. When the magnetic tape T returns to the original position 15, the count value of the up-down counter 302 becomes "0" and the microcomputer 30, detecting this by the decoder 307, causes the decoder 307 to provide a recording signal REC to the mechanism control circuit 305 and a preset signal to the position information generation circuit 22. Accordingly, the mechanism finds itself in a recording condition and the counter of the position information generation circuit 22 is preset by receiving the information "105" on the starting position of after-recording latched to the latch circuit 304.

When recording is started, the position information generation circuit 22 successively adds the reference clock from the oscillation circuit 21 to the aforementioned preset value and the position information thus obtained is transferred to the position information recording head 26 through the modulation circuit 23 and the recording circuit 24, and is recorded on the track $T_1$ of the magnetic tape T. At the same time, the primary information received by the digital encoder circuit 17 from the input terminal 16 is digitized and transferred to the primary information receiving head 20 through the modulation circuit 18 and the recording circuit 19 and recorded on the tracks $T_2$ through $T_S$ on the magnetic tape T. The new information 14 is thus recorded on the magnetic tape T.

What has been described above is a situation where there is already an earlier recorded information on the magnetic tape. Next, a situation will be considered where it is desired to record both primary information and position information from the middle of a magnetic tape having thereon no earlier recorded information.

If the after-recording key AR is operated when the heads are in contact with the magnetic tape T at the position where it is desired to start recording, a rewinding signal is transferred from the key decoder 301 to the mechanism control circuit 305 as in the previously described situation of after-recording, and the mechanism is put in a rewinding mode. At the same time, the up-down counter 302 is set to "0". Thereafter, pulses are provided from the mechanism driving circuit 31 as the magnetic tape T is rewound and counted by the up-down counter 302 which further provides them to the computing circuit 303. Since the position information detection circuit 306 cannot obtain any position information, however, there is no detection signal to be outputted and the magnetic tape T is run to its starting end. As a result, an end detection signal END is outputted from the mechanism driving circuit 31 and is given to the position information detection circuit 306 which, then, outputs "0" as position information. It is combined with the distance information (such as "X") counted at the time of rewinding and the computing circuit 303 obtains as a result position information "X" as the starting position for after-recording.

Next, the position information detection circuit 306 outputs a detection signal, latches the aforementioned position information "X" to the latch circuit 304 as in the previous case, sets the up-down counter 302 in a down-count mode, and further causes the mechanism control circuit 305 to drive the mechanism driving circuit 31 so as to switch the mechanism into the fast-forward mode. The rest is the same as described above. When the magnetic tape T returns to the original position, the counter of the position information generation circuit 22 is preset by the position information "X" and recording of primary information and position information is then started from the position on the magnetic tape corresponding to the position information "X".

In summary, a recording device of the present invention can record normal position information even from a middle point of an unrecorded magnetic tape together with a primary information. This feature makes the device more useful, for example, in editing magnetic tapes. Moreover, after-recording can be effected from a desired position on a magnetic tape by a simple operation on an input means such as a keyboard. Although the present invention has been described above in terms of only one embodiment, many variations and modifications which will be obvious to a person skilled in the art are considered to be within the purview of the present invention and included within the scope of the following claims.

What is claimed is:

1. A magnetic recording and reproducing device adapted to record on a magnetic tape not only primary information such as an audio signal but also position information for showing the position of said primary information, comprising
    an oscillation circuit adapted to generate a reference clock,
    a position information generation circuit having a presettable counter adapted to count said reference clock and to generate a position information,
    a recording head means adapted to record said position information on a specified track on a magnetic tape,
    a reproducing head means adapted to pick up a position information on said magnetic tape,
    a mechanism driving circuit adapted to control a mechanism for moving said magnetic tape,
    a key input means, and
    a central control circuit which is electrically connected to said key input means, said position information generation circuit, said reproducing head means and said mechanism driving circuit, said central control circuit including
    a mechanism control circuit adapted to cause said mechanism driving circuit to drive said mechanism to rewind said magnetic tape from a first position in response to an operation for after-recording on said key input means,
    an up-down counter adapted to count a distance traveled by said magnetic tape,
    a position information detection circuit adapted to detect an end position information of an earlier recorded information which is obtained from said reproducing head means when said magnetic tape is rewound,
    a computing means adapted to compute an after-recording starting position information on the basis of said end position information and said distance, and further adapted to store it temporarily in a memory means, said mechanism control circuit being further adapted to cause said mechanism driving circuit to drive said mechanism to move said magnetic tape by said distance to said first position when said position information detection circuit detects said end position information, and
    a circuit means adapted to preset said counter by inputting said after-recording starting position information stored in said memory means to said counter when said magnetic tape advances to said first position and to set said mechanism in a recording mode through said mechanism control circuit and said mechanism driving circuit, said recording head means being adapted, when said mechanism is in said recording mode, to record new primary information and new position information on said magnetic tape, whereby said new primary information and said new position information can be recorded after said earlier recorded information on said magnetic tape.

2. A magnetic recording and reproducing device adapted to record on a magnetic tape not only primary information such as audio signals but also position information for showing the position of said primary information, comprising
    an oscillation circuit adapted to generate a reference clock,
    a presettable counter adapted to count said reference clock and to generate a position information,
    a recording head means adapted to record said position information on a specified track on a magnetic tape,
    a reproducing head means adapted to pick up a position information on said magnetic tape,
    a mechanism driving circuit adapted to control a mechanism for moving said magnetic tape, a key input means, and a central control circuit which is electrically connected to said key input means, said presettable counter, said reproducing head means and said mechanism driving circuit, said central control circuit including a mechanism control circuit adapted to cause said mechanism driving circuit to drive said mechanism to rewind said magnetic tape from a first position in response to a key input from said key input means, an up-down counter adapted to count a distance traveled by said magnetic tape, an end detection signal outputting means for outputting an end detection signal at the end of said magnetic tape when said magnetic tape is rewound, a memory means for temporarily storing the value counted by said up-down counter at starting position information in response to said end detection signal, said mechanism control circuit being further adapted to cause said mechanism driving circuit to drive said mechanism to advance said magnetic tape to said first position in cooperation with said up-down counter when said end detection signal is obtained, and a circuit means adapted to preset said counter by inputting to said counter said starting position information stored in said memory means when said magnetic tape advances to said first position and to set said mechanism in a recording mode thorugh said mechanism control ciruit and said mechanism driving circuit, said recording head means being adapted, when said mechanism is in said recording mode, to record a new primary information and a new position information on said magnetic tape.

3. A magnetic recording and reproducing device adapted to record on a magnetic tape both a primary information such as audio signals and a position information indicating the position of said primary information, said device comprising reproducing-storing means for reproducing and storing a position information which is already recorded, detecting means for detecting the distance traveled by a magnetic tape from the position corresponding to said position information reproduced and stored by said reproducing-storing means, counting means for obtaining a new position information by counting up or down from said stored position information according to said distance traveled by said tape, and recording means for recording on said tape a new position information according to said new position information when a new primary information is recorded.

4. A magnetic recording and reproducing device adapted to record on a magnetic tape both a primary information such as audio signals and a position information indicating the position of said primary information, said device comprising reproducing means for reproducing position information, first tape driving means for driving a tape from a first position to the position of at least one position information near said first position, detecting means for detecting the distance traveled by said tape from said first position to said position of said at least one position information according to the motion of said tape driving means, converting means for converting an output from said detecting means into a position information value, computing means for computing the position information of said first position according to said at least one position information reproduced from said reproducing means and said position information value, storage means for storing the position information of said first position from said computing means, second tape-driving means for driving said tape from the position of said at least one position information to said first position, and recording means for recording at said first position said position information stored in said storage means.

5. The device of claim 4 further comprising end detecting means for detecting the beginning or the end of said magnetic tape, and means for storing an output from said tape end detecting means as the position information for the beginning or end of said tape.

* * * * *